May 13, 1958
L. C. MILLER
2,834,519
DISPENSER CAP
Filed Nov. 25, 1955
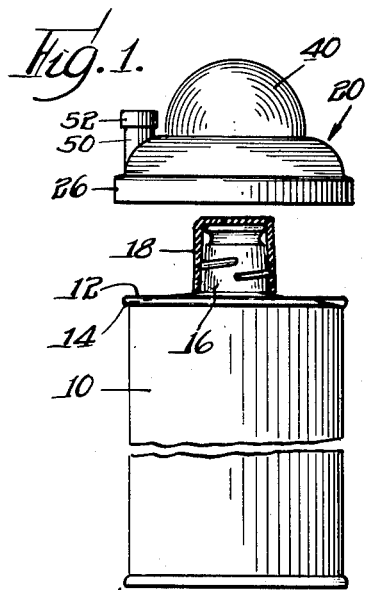
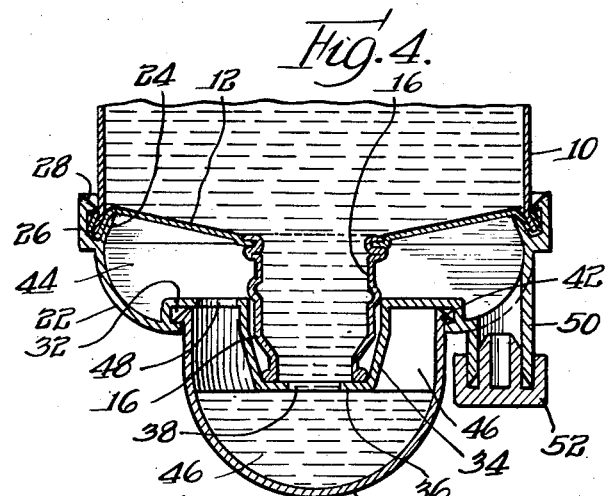
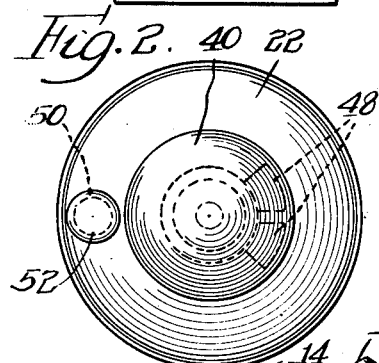
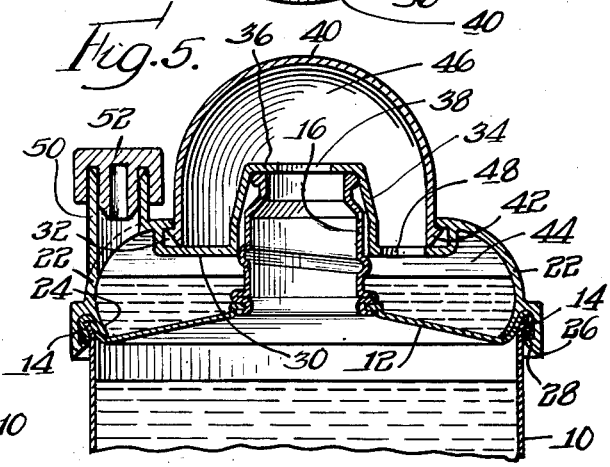
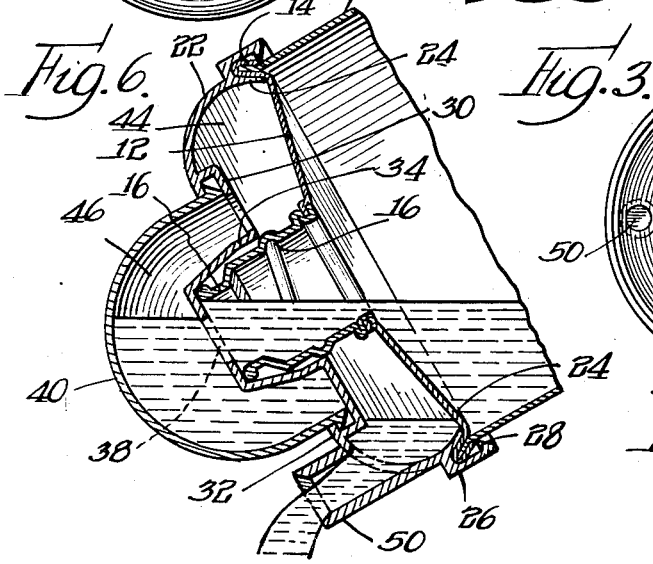
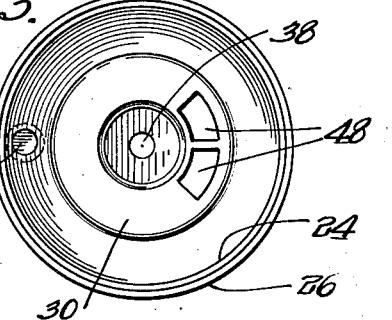
INVENTOR.
Lloyd C. Miller
BY
Olson & Trexler
attys.

United States Patent Office 2,834,519
Patented May 13, 1958

2,834,519

DISPENSER CAP

Lloyd C. Miller, Blue Island, Ill., assignor to Formold Plastics, Inc., Blue Island, Ill., a corporation of Illinois Application November 25, 1955, Serial No. 548,898

18 Claims. (Cl. 222—455)

The present invention is concerned with the dispensing of liquids, semi-liquids and fluent solid materials, such as granular and pulverulent materials, and more particularly to new and useful improvements in a dispenser with improved means for attachment to a container for measuring and dispensing predetermined charges of the material upon prescribed manipulation of the assembled container and dispenser.

In the dispensing of liquids or other fluent materials, it is often desirable to dispense a predetermined amount at each pouring. This may be for the purpose of dispensing a predetermined measured quantity of the material, or it may be primarily for the purpose of preventing the user from dispensing too much of the material. As an example of the latter case, household detergents are not harmful when used in proper amounts, but not infrequently a housewife will pour too much of the material into the washing or other solution with the result that the solution may be stronger than intended with the result that the hands may be roughened. Often such detergents or other materials are sold in containers having a closure which may be removed to serve as a measuring device, but frequently this closure is not used for the purpose but rather the contents are poured directly into the washing or other solution in amounts resulting from mere guesswork and if too much is used, the solution may be too strong.

An object of the present invention is to provide a dispenser which may be readily attached to a container for dispensing measured quantities of material therefrom.

A further object of the invention is to provide a dispenser having improved means for attaching the same to a conventional container so as to provide a measuring chamber in direct communication with the dispensing opening of the container and a dispensing compartment communicating therewith so that manipulation of the assembly will result in the dispensing of measured quantities of the material.

A further object of the invention is to provide a dispenser which may be readily attached to a conventional container for liquids or other fluent material in a manner such that the resulting assembly provides a measuring chamber and a dispensing or collection compartment with the end wall of the container serving as the bottom wall of the dispensing or collection compartment.

A still further object of the present invention is to provide a dispenser of the above type which is particularly adapted for use with a container having a pouring spout which provides direct communication between the interior of the container and the measuring chamber of the dispenser, thus traversing the dispensing or collection compartment.

Another object of the invention is to provide a dispenser substantially of the above type wherein the inversion of the container and dispenser assembly serves to measure a predetermined amount of material which, upon upright positioning of the container assembly, is collected in the dispensing compartment, and wherein subsequent pouring of this collected material from the dispensing compartment will result in a further predetermined charge being accumulated in the measuring chamber for release into the dispensing compartment. Thus, after the initial measured charge is collected, subsequent operation of the assembly results in a pouring of the exact measured charge and a simultaneous collection of the new measured charge in the same predetermined amount.

A still further object of the invention is to provide a dispenser substantially of the above type wherein the attachment portion of the dispenser is slightly flexible, although stiff enough to maintain its predetermined shape, so that the flexibility thereof serves to accommodate the dispenser to minor irregularities in the manufactured container, thus facilitating attachment of the dispenser to the container in properly sealed relationship.

A still further object of the invention is to provide a dispenser substantially of the above type wherein the entire wall portion, or parts thereof, may be transparent for viewing the material being dispensed, and the invention also contemplates a dispenser wherein a part of its body wall may be more rigid than the attachment portion.

The invention still further aims to provide a dispenser which will readily accommodate a pouring spout on a container so that the assembly is not unduly tall and this result is enhanced by utilizing the top wall of the container as the bottom wall of the dispensing compartment.

The invention still further aims to provide a dispenser which is economical to manufacture, which is relatively simple in construction and which may be readily assembled with the container without the use of special tools or the like.

The above and other objects of the invention will in part be obvious and will be hereinafter more fully pointed out.

In the accompanying drawings:

Fig. 1 is a side elevation showing a typical form of spouted container before its closure is removed and showing the dispenser in position ready for attachment to the container after the closure is removed;

Fig. 2 is a top plan view of the dispenser unit;

Fig. 3 is a bottom plan view of the dispenser unit;

Fig. 4 is a fragmentary side sectional view showing initial inversion of the assembled container and dispenser to collect a measured quantity of material in the measuring chamber;

Fig. 5 is a similar fragmentary side sectional view showing the assembled container and dispenser when thereafter turned to an upright position for collecting the measured quantity of material in the dispensing compartment, and Fig. 6 is a similar fragmentary side sectional view showing the assembled container and dispenser when thereafter partially tipped for dispensing the collected quantity of material from the dispensing compartment and also showing initial filling of the measuring chamber for another measured charge of the material as the preceding charge is dispensed.

Referring more in detail to the accompanying drawings, and particularly Fig. 1 at this time, there is shown a container 10 which may be of sheet metal, plastic, paper, glass or other suitable material and this container has secured thereto a top end closure 12 by means of a conventional double seam, or the like, which provides an outwardly projecting bead structure 14. The container 10 is illustrated as being of the type including a centrally disposed upstanding pouring spout 16 from which the conventional screw closure 18 is to be removed before attachment thereto of the dispenser which is indicated generally by the numeral 20.

The dispenser unit includes a lower cap or body section 22 which is provided with a curved wall portion which terminates at its lower end in an internal skirt portion 24, reference being made to Fig. 5. Exteriorly of the skirt portion 24 is a snap-on portion which is provided with a depending peripheral skirt 26 and this skirt 26 is provided with an inwardly extending continuous or discontinuous flange 28. Thus, to attach the dispenser to the container, the bead structure 14 of the container is received within the recess formed between the inner and outer skirt portions 24, 26 and the flange means 28 snaps beneath the outwardly projecting portion of the bead structure to hold the dispenser thereon. The cap or body section 22 of the dispenser may be formed of any suitable material but preferably is formed of a material which is slightly flexible but which is also stiff enough to maintain its predetermined shape. Thus, the cap portion 22 may be formed of a suitable plastic material, as polyethylene. There is thus provided inherent flexibility in the outer skirt 26 and the flange means 28 so that the dispenser may be secured to containers having minor variations in the bead structure and still provide a fluid-tight seal.

The upper edge of the curved wall of the cap portion 22 is provided with a downwardly offset annular portion 30 which provides with the annular edge of the adjacent cap wall an outwardly extending recess 32. The inner edge of the annular wall portion 30 is directed upwardly as at 34 and terminates in a closing wall 36 which is provided with a central aperture 38. It will be noted that the wall portion 36 provides a flange against which the open end of the container spout 16 abuts to provide a seal and afford direct communication from the interior of the container through the aperture 38. Since the material of the flange and truncated portion 34 is also slightly flexible, the dispenser is easily adapted to nozzles which may vary slightly in manufacture.

There is provided an upper or outer member 40 which is illustrated as being in the form of a dome and this member 40 is provided with an outwardly directed flange 42 which snaps within the recess 32 in the cap member to hold the two members in assembled and sealed relationship. The dome member 40 forms a measuring chamber or receptacle and of course is in communication with the interior of the container through the aperture 38. The dome member 40 may be formed of a relatively harder material such as polystyrene or other relatively hard plastic which may be transparent, if desired.

It will be seen that the top end closure 12 of the container forms with the interior surface of the cap member 22 a compartment which may be conveniently termed a dispensing or collection compartment 44 and this compartment communicates with the measuring chamber 46 by means of apertures 48 through the annular wall portion 30. Remote from the aperture or apertures 48, there is provided a pouring spout or nozzle 50 through the curved wall of the cap member 22. This pouring spout may be closed by a suitable form of plastic cap 52. It is to be noted that the pouring spout 50 is diametrically opposite the aperture or apertures 48, that is, they are disposed 180° from one another for a purpose to be referred to hereinafter.

The container 10 and its closure cap 18 may be sold as a separate unit and the dispenser itself may also be sold as a separate unit. However, this container may be sold with the dispenser attachment. In either case the user will remove the conventional screw cap 18 and apply the dispenser 20 in the manner which should be apparent from the above description. Briefly, after the cap 18 is removed from the spout 16 of the container, the user can fit the skirt portions 24, 26 over the bead structure 14 on the container and press the same downwardly so that the flange means 28 will snap beneath the bead structure and hold the dispenser in its assembled position with the container.

In using the assembled container and dispenser, the assembly is tipped upsidedown to the inverted position of Fig. 4 where material from the container will flow through the spout 16 and aperture 38 into the measuring chamber 46 provided by the dome member 40 to the level of the liquid as indicated where the aperture 38 will be sealed against ingress of additional air. Then the container is righted to the upright position of Fig. 5 in which position the collected material in the measuring chamber 46 will flow through the apertures 48 into the dispensing or collecting chamber 44, as indicated. Then the cap 52 is removed and the assembly tilted for pouring to substantially the position of Fig. 6. In this position, the material collected in the dispensing compartment 44 will flow outwardly through the pouring spout 50. At the same time, when tilting reaches a predetermined angle, material from the container will find access into the spout 16 and will then flow through the aperture 38 into the measuring chamber 46 where an additional predetermined amount of material will be collected. The dome member 40 may be of various sizes to accommodate different amounts of a measured charge, depending upon the nature and purpose of the material being dispensed. After the material from the dispensing compartment 44 has been completely discharged through the nozzle 50, and the nozzle is positioned to require an almost complete inversion of the assembly, the assembly is again righted to the position of Fig. 5 and the accumulated measured charge of material in the measuring chamber 46 will again flow through the apertures 48 into the dispensing compartment 44 so that another measured charge of material is ready for dispensing when the assembly is again tilted for dispensing of the material through the spout 50. The substantially 180 degree displacement between the apertures 48 and the pouring spout 50 is for the purpose of preventing any continuous pouring condition. Thus, for example, if the user tilts the assembly for pouring only to about 60 degrees, as is often the case, the apertures 48 would still be in a position to prevent liquid from flowing from the measuring chamber 46 to the compartment 44 until the assembly is restored to its substantially upright position. Further, with the container quite full, liquid entering the measuring chamber 46 from the spout 16 will seal the aperture 38 and thus even with slight tilting when the container is quite full, a predetermined measured charge of material is accumulated in the measuring chamber 46 and the size of the dome member 40 is selected for this purpose. Also, under such conditions, the sealing of the aperture 38, even with slight tilting, will prevent material from gaining access to the apertures 48 and so prevent a continuous pouring condition. In addition to the substantially 180° displacement between the apertures 48 and the pouring spout 50, the offset relationship between the apertures 38, 48 also assists in preventing a continuous pouring condition in that the container must be righted from its tilted position for the accumulated material in the measuring chamber 46 to gain access to the apertures 48 and thence into the dispensing compartment 44.

With a container, as illustrated with an upstanding pouring spout 16, the truncated portion 34 of the partition wall 30 between the measuring chamber 46 and the dispensing compartment 44 serves to compensate partially for the height of such pouring spout with the result that the dispenser attachment is not unduly tall. Use of the end closing wall 12 of the container as the bottom wall of the dispensing compartment 44 also contributes to this advantage. Actual attachment of the dispenser unit to the container may be made in various ways so long as there is provided a seal, such as by the peripheral flange means, to seal the dispensing compartment 44. While the nozzle 16 in the illustrated form of the invention, provides a central direct passage between the container and the measuring chamber 46, it will be appreciated that the nozzle or spout formation could be formed as a dependent passage from the partition wall 30 and this would be particularly true in a container wherein the spout was quite low. Both the body section 22 and the dome member 40 may be conveniently molded from plastic materials and the flexibility at least of the body section 22, and its structural parts, provides for a convenient snap fastening and seal with the container by reason of the skirts 24, 26 and flange means 28, and also the flexibility of the truncated part and the annular portion 36 around the aperture 38 also serves to conveniently seal the end of a nozzle which may vary slightly in height or transverse dimension. The two sections 22, 40 may be conveniently snapped together by reason of the recess 32 and flange 42.

While one form of the invention has been shown for purposes of illustration, it is to be clearly understood that various changes in the details of construction and arrangement of parts may be made without departing from the scope and spirit of the invention as set forth in the appended claims.

The invention is hereby claimed as follows:

1. A dispenser adapted for attachment to the apertured end of a container holding fluent material, and comprising a body portion having upper and lower compartments and partition means separating the same and adapted to cooperate with the container aperture to seal the lower compartment from the container aperture except through the partition means, aperture means through the partition means communicating with the upper compartment and adapted to provide direct communication with the container aperture, said lower compartment having an open bottom with peripheral sealing means around the edge thereof engageable with the container end to complete therewith the sealing of the lower compartment, aperture means through the partition means providing separate communication between the upper compartment and the lower compartment, and a dispensing opening in the wall of the lower compartment for dispensing material accumulated therein.

2. A dispenser as claimed in claim 1, wherein the partition means includes a central truncated portion through the upper surface of which the aperture means in communication with the upper compartment extends, and wherein the other aperture means through the partition is offset therefrom.

3. A dispenser as claimed in claim 1, wherein the upper and lower compartments are formed of separate body sections each having an open bottom end, and wherein both aperture means extend through the partition means which forms the top of the lower body section and wherein there is provided an interlocking connection exteriorly of the aperture means between the upper and lower body sections.

4. A dispenser as claimed in claim 3, wherein the interlocking connection in the upper and lower body sections comprises a peripheral undercut recess in one section and a cooperating peripheral flange on the other section snapped into said recess.

5. A dispenser as claimed in claim 1, wherein the upper and lower compartments are formed of separate body sections interlocked with one another with the lower body section formed of a material which is slightly more flexible than that of the upper section to facilitate interconnection therebetween.

6. A dispenser adapted to be attached over the apertured end of a peripheral beaded container holding fluent material, and comprising a body portion having upper and lower compartments, aperture means communicating with the upper compartment and adapted to provide direct communication with the container aperture, aperture means providing separate communication between the upper and lower compartments, partition means separating the upper and lower compartments and adapted to cooperate with the container aperture to seal the lower compartment from the container aperture except through the aperture means, means providing a peripheral recess at the bottom edge of the body portion adapted for snug interengagement with the container bead to attach the dispenser to the container, and a dispensing opening in the wall of the lower compartment for dispensing the material accumulated therein.

7. A dispenser as claimed in claim 6, wherein the peripheral recess comprises inner and outer skirt portions and inwardly directed flange means adapted to snap beneath the container bead.

8. A dispenser to be attached over the apertured end of a peripherally beaded container holding fluent material, and comprising a lower body section forming a lower compartment and having peripheral holding means attachable to the container bead, an upper body section forming an upper chamber, means providing direct communication between the container aperture and the upper chamber to receive material from the container, means providing separate communication between the upper chamber and the lower compartment to deliver material from the upper chamber to the lower compartment, a dividing wall between said compartments serving to seal the lower compartment from the container aperture except through the said communication providing means and a dispensing opening in the wall of the lower body section communicating with the lower compartment for dispensing the material accumulated therein from the upper chamber.

9. A dispenser as claimed in claim 8, wherein the lower body section is formed of a plastic material having the resiliency characteristics of polyethylene to maintain its shape while permitting slight flexing to accommodate irregularities in the container formation.

10. A dispenser as claimed in claim 8, wherein the upper body section is formed of a relatively hard and transparent plastic material having the characteristics of polystyrene.

11. A dispenser as claimed in claim 8, wherein the lower body section is formed of polyethylene and the upper body section is formed of polystyrene.

12. A dispenser adapted for attachment to a container having an end wall joined to the body wall by a seam forming a peripheral wall and a pouring spout projecting upwardly from the end wall, and comprising a lower body section having a depending peripheral skirt terminating in a peripheral recess adapted for spring attachment to the container bead to provide with the top closing wall thereof a dispensing compartment, said body section including a transverse partition having an annular undercut recess therearound and a centrally disposed upstanding apertured spout portion adapted to receive the container spout, an upper section having flange means engaged in the annular undercut recess to provide a measuring chamber in communication with the apertured spout, said partition wall having an aperture therein to afford communication between the measuring chamber and the dispensing chamber, and a pouring spout in said lower body section communicating with said dispensing compartment at a point substantially diametrically opposed to said aperture whereby the measuring chamber will be filled upon each tilting of the assembly without continuous pouring.

13. A dispenser as claimed in claim 12, wherein the peripheral recess on the lower body section is formed between inner and outer skirt portions and wherein the outer skirt portion is provided with inwardly directed flange means engageable beneath the container bead.

14. A dispenser for a container with an upper closing wall which is apertured from the egress of material therefrom; and comprising a body portion having an intermediate transverse partition dividing the same into an upper measuring chamber and a lower chamber having an open bottom defined by a peripheral wall with its lower edge symmetrical with respect to the top edge of the container and adapted to be secured thereto to form a dispensing compartment with the top of the container, means providing communication between the aperture in the closing wall of the container and said measuring chamber whereby upon inverting the assembly a predetermined amount of material will be collected in said measuring chamber, means providing separate communication between said measuring chamber and said dispensing compartment whereby subsequent upright positioning of the assembly will discharge the measuring quantity of material from the measuring chamber to said dispensing compartment, and an outlet in communication with said dispensing compartment for discharging the measured charge from the dispensing compartment upon tilting of the assembly.

15. A dispenser as claimed in claim 14, wherein the communication means between the measuring chamber and the dispenser compartment is displaced substantially 180° from the outlet in communication with the dispenser compartment to prevent continuous pouring of material.

16. A dispenser as claimed in claim 14, wherein the body portion comprises upper and lower sections with the lower section formed of a somewhat resilient plastic material, and wherein the lower edge of the peripheral wall of the lower section is provided with resilient flange means engageable with a bead on the container for connecting the same.

17. A dispenser as claimed in claim 16, wherein the top of the lower body section forms the transverse partition around which is provided an undercut recess with flexible wall portions, and wherein the upper body section is provided with an outward flange snapped into said recess for interlocking sealed engagement therewith.

18. A combined container and dispenser assembly comprising a container having a top end closing wall secured to the body portion of the container by an offset double seam and a pouring spout projecting upwardly from the end closing wall; and a dispenser comprising a cap member having a depending open skirt portion provided with a peripheral recess to snugly receive the container double seam and support the dispenser thereon, partition means dividing said dispenser into an upper measuring chamber and a lower dispensing compartment having the top end closing wall of the container as the bottom wall thereof, a pair of passages through said partition means, one passage forming communication between the container pouring spout and the measuring chamber to admit a measured charge of material to the measuring chamber upon tilting of the assembly to a predetermined degree, the other said passage forming separate communication between the measuring chamber and the dispensing compartment to pass the measured charge of material from the measuring chamber into the dispensing compartment upon upright positioning of the assembly, and a dispensing opening communicating with the dispensing compartment for discharging the measured charge of material therefrom upon subsequent tilting of the assembly to a predetermined degree which will direct another measured charge of material into the measuring chamber.

References Cited in the file of this patent
UNITED STATES PATENTS

| | | |
|---|---|---|
| 1,066,127 | Lewis | July 1, 1913 |
| 1,520,502 | Lundblad | Dec. 23, 1924 |
| 2,601,039 | Livingstone | June 17, 1952 |